United States Patent [19]

Mims

[11] 4,098,909
[45] Jul. 4, 1978

[54] COOKIE CAPPER METHOD

[76] Inventor: Herman D. Mims, P.O. Box 26794, Charlotte, N.C. 28213

[21] Appl. No.: 759,524

[22] Filed: Jan. 14, 1977

Related U.S. Application Data

[62] Division of Ser. No. 603,051, Aug. 8, 1975.

[51] Int. Cl.² .................. A21D 13/00; A21C 15/00
[52] U.S. Cl. .................. 426/274; 99/450.4; 99/644; 198/402; 198/407; 426/275; 426/519
[58] Field of Search ............ 426/274, 275, 279, 280, 426/94, 103, 89, 138, 143, 283, 282, 297, 391, 502, 503, 519, 572, 281, 273, 302, 808, 811; 198/374, 394, 402, 406, 407, 409; 425/104; 99/450.4, 450.5, 450.6, 450.7, 443 C, 644

[56] References Cited

U.S. PATENT DOCUMENTS

| | | | |
|---|---|---|---|
| 1,575,207 | 3/1926 | Hungerford | 99/450.4 |
| 2,817,306 | 12/1957 | Oakes | 99/450.4 |
| 2,910,017 | 10/1959 | Oakes | 99/450.4 |
| 3,225,716 | 12/1965 | Krooss et al. | 198/402 X |
| 3,343,504 | 9/1967 | Beik | 99/450.4 |
| 3,348,503 | 10/1967 | Beik et al. | 99/450.4 |
| 3,450,026 | 6/1969 | Szabrak | 99/407 |
| 3,501,036 | 3/1970 | Calistrat | 198/409 X |
| 3,516,532 | 6/1970 | Calistrat | 198/409 X |

*Primary Examiner*—Kenneth M. Schor
*Attorney, Agent, or Firm*—Sughrue, Rothwell, Mion, Zinn and Macpeak

[57] ABSTRACT

As a plurality of rows of baked cookie halves, each having a flat side and a rounded side, leave the oven-cooler on a transfer conveyor belt they are allowed to fall off the end of the belt onto a lower conveyor belt. Every other row is allowed to free-fall with the result that they flip 180° in mid air while the remaining rows are guided by a slide which is moved into position so that alternate rows of cookie halves on the lower conveyor belt are disposed with the flat side up and the flat side down, respectively. A filling is automatically deposited on the cookie halves having the flat side up and a vacuum pick-up device raises each row of cookie halves having the flat side down and deposits them on the filled cookie halves as they pass underneath.

2 Claims, 14 Drawing Figures

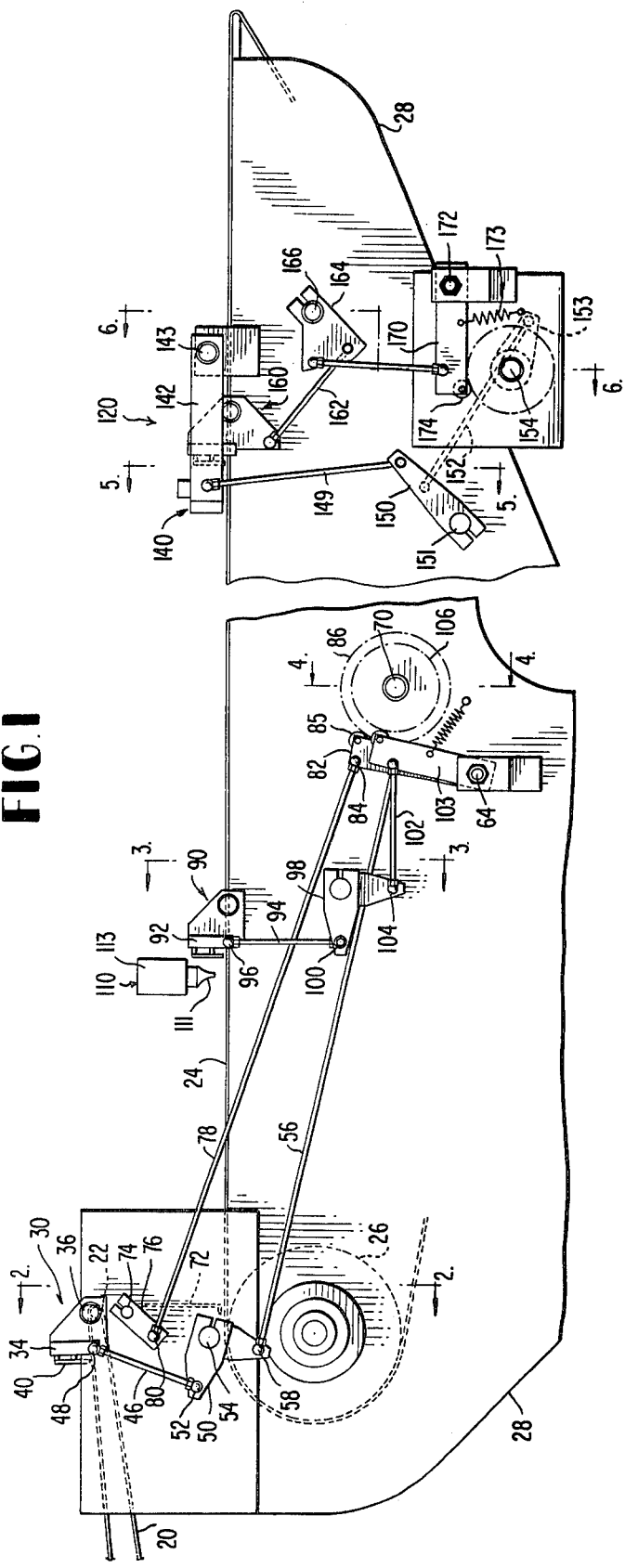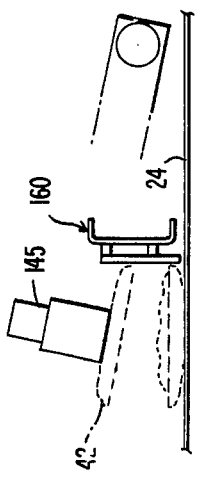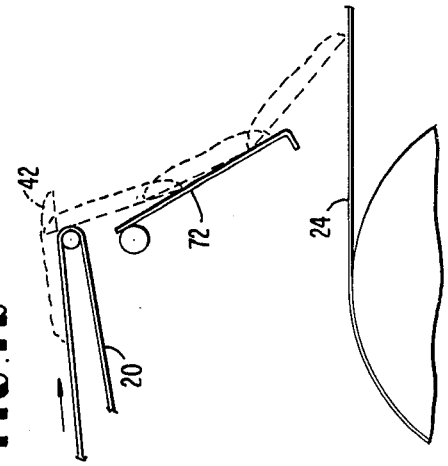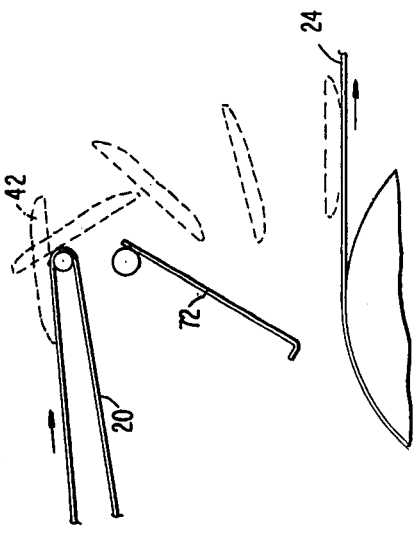

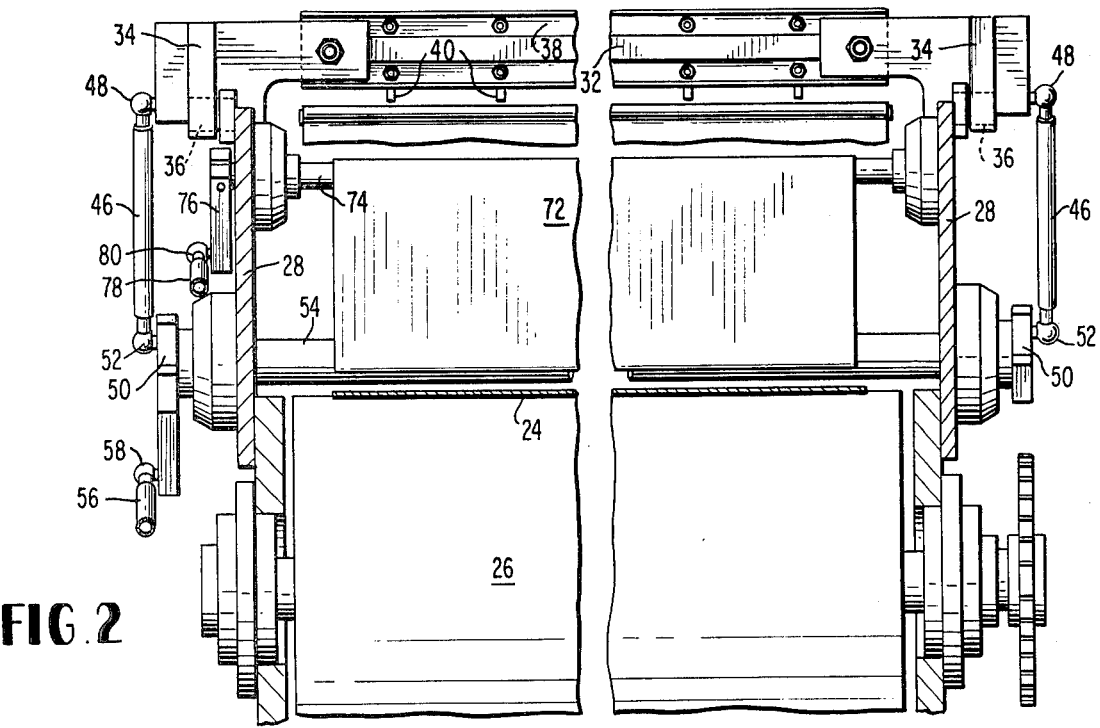
FIG. 2
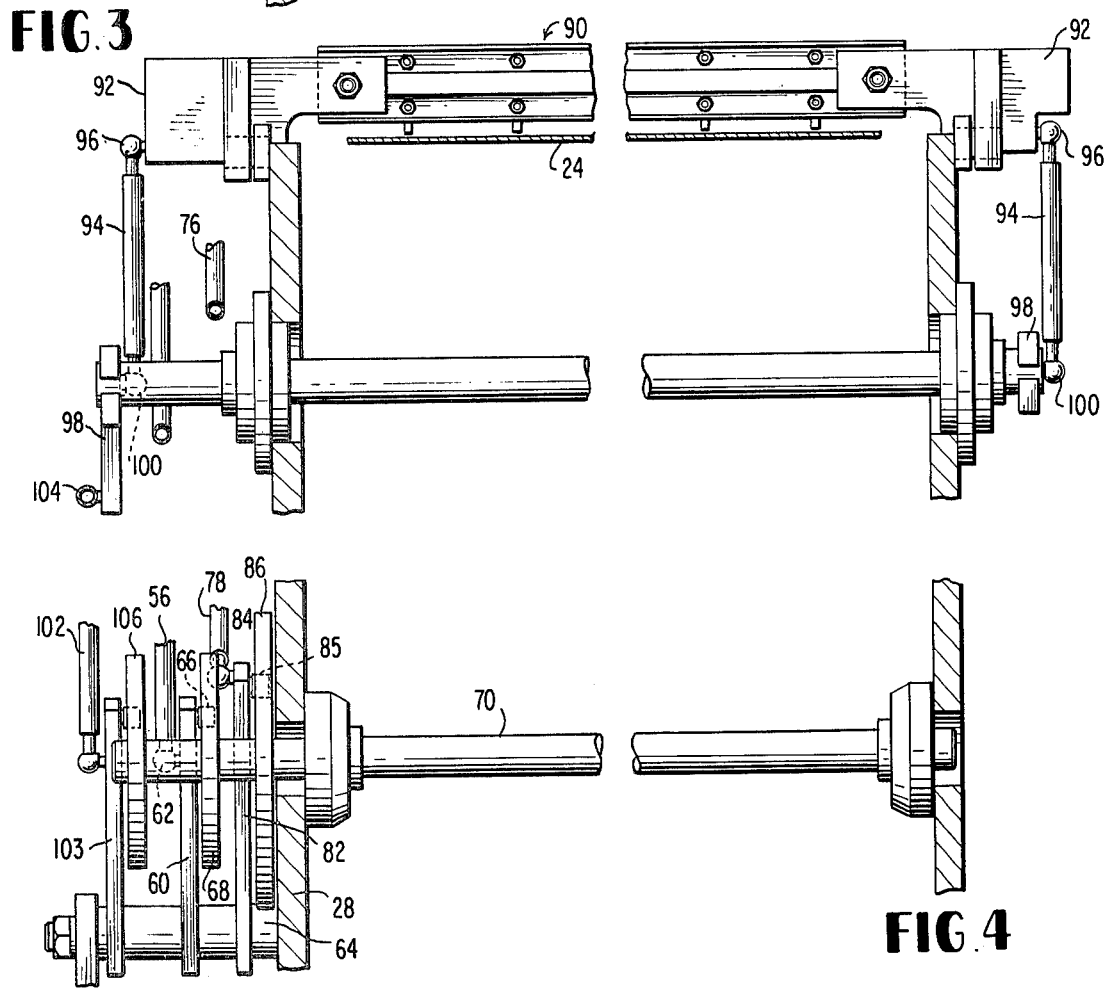
FIG. 3
FIG. 4

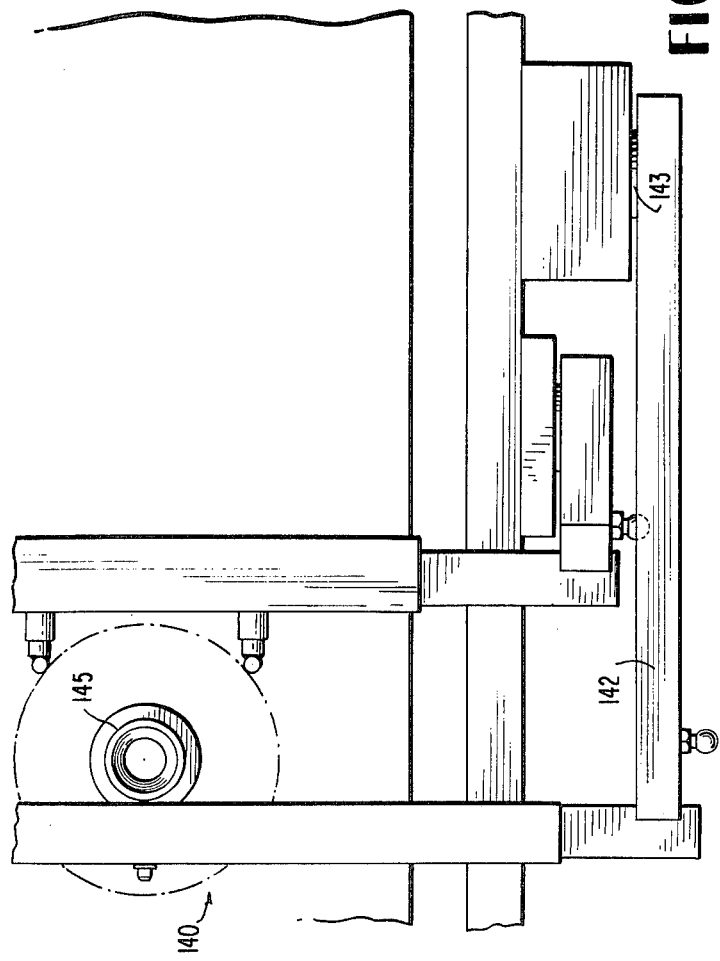
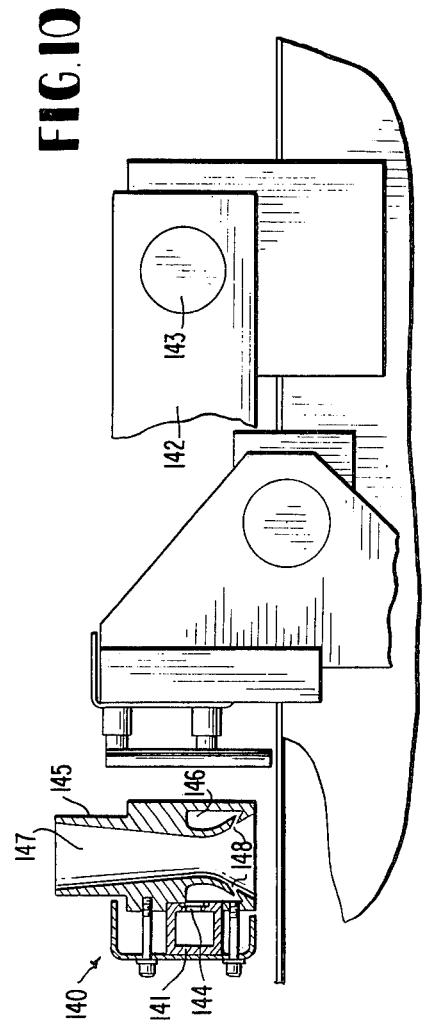
FIG.9
FIG.10
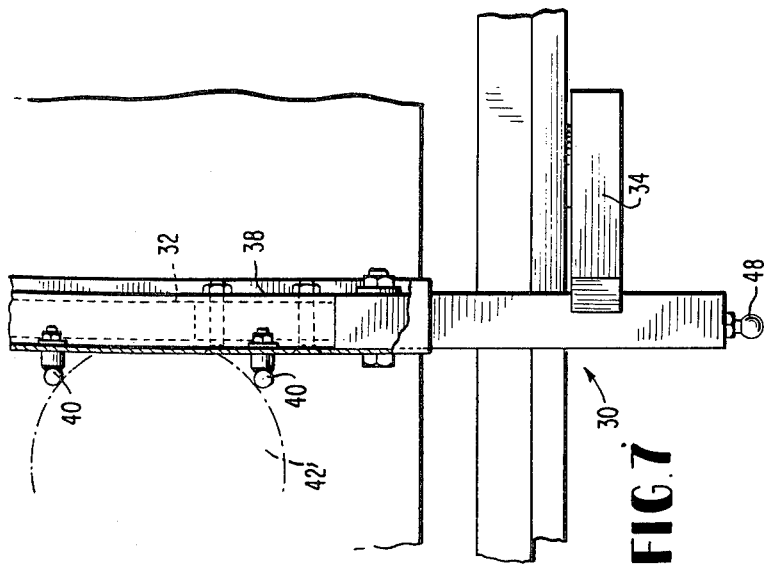
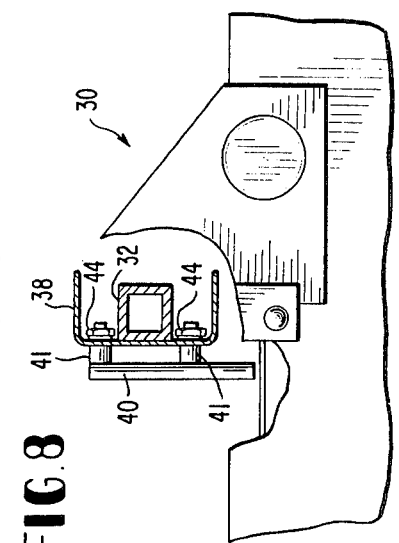
FIG.7
FIG.8

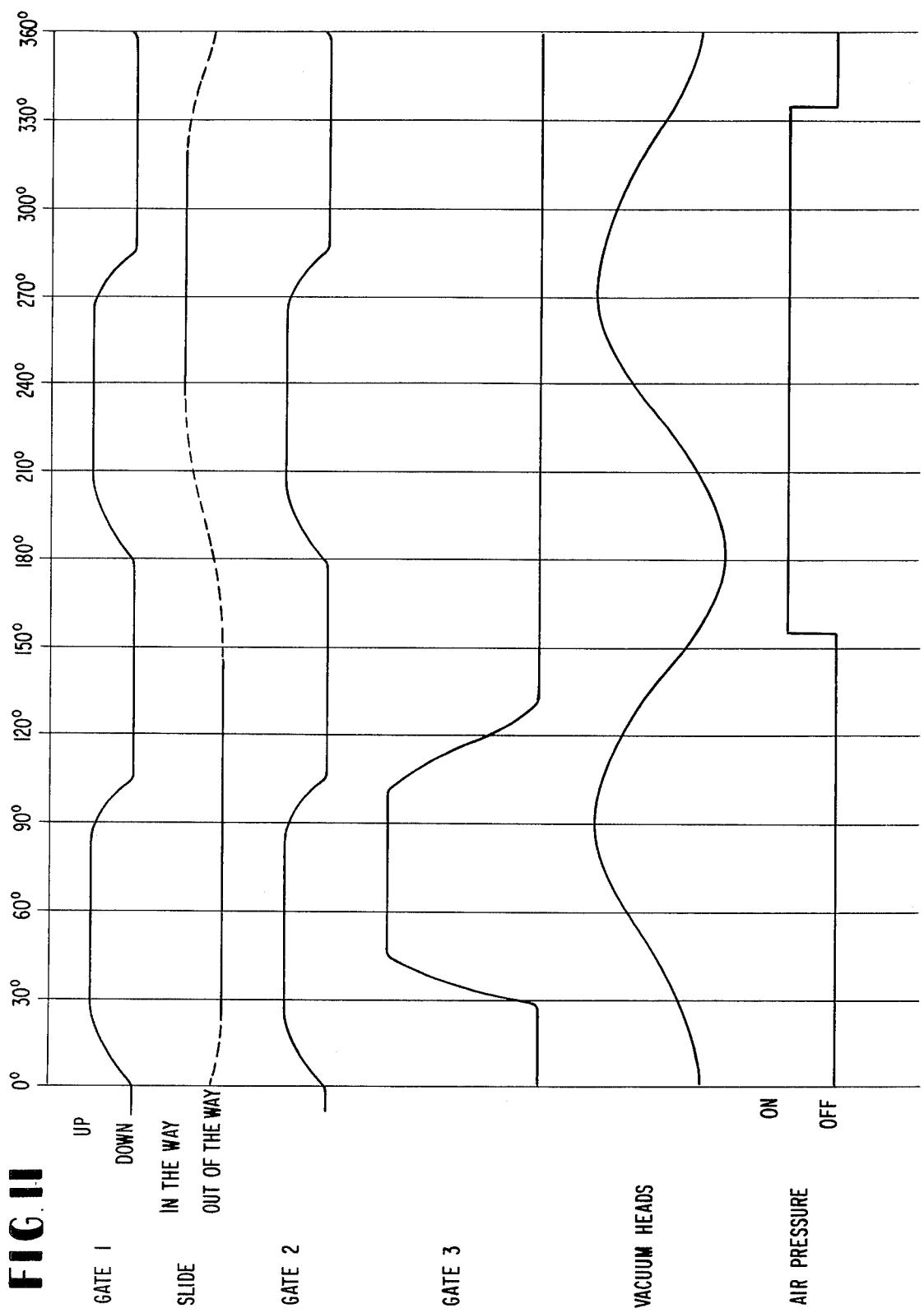

4,098,909

COOKIE CAPPER METHOD

This is a division of application Ser. No. 603,051, filed Aug. 8, 1975.

BACKGROUND OF THE INVENTION

1. Field of the Invention

The present invention is directed to a cookie capper apparatus and method, and more specifically to an automated arrangement for inverting every other row of cookie halves on a conveyor belt, depositing a filling on the inverted cookie halves and transferring the other cookie halves on top of the filled cookie halves.

2. Prior Art

For many years the art of sandwich making or the making of filled cookies involved the manual step of placing a cover half on the half on which the filling had been placed.

It is also known in the art of sandwich making or the making of filled cookies to provide an automated arrangement for placing one sandwich half or cookie half on top of another sandwich half or cookie half upon which a filling has been placed as the halves travel along a conveyor belt. In many instances it is completely immaterial as to which side of the sandwich half or the cookie half the filling is placed and is likewise immaterial as to the disposition of the cover half, since both sides of each half are identical in nature. Thus, while it is old and well known in the art to utilize a vacuum transfer device for picking up a row of cover halves and depositing them on the filled lower halves, these machines do not make any prior provisions for inverting the rows of halves upon which the filling is to be deposited. Furthermore, such vacuum devices require a compound movement to be synchronized with the conveyor as does the filling apparatus.

Other prior art machines provide for feeding a plurality of rows of sandwich halves or cookie halves wherein the "inner" surface of each half is disposed upwardly. The filling is then automatically deposited on the halves in every other row and the unfilled halves are inverted and placed on top of the filled halves so that the "inner" surface of each half contacts the filling.

Still other prior art machines contemplate feeding the sandwich halves or cookie halves from a cartridge in which the halves are all disposed with their "inner" surfaces facing in the same direction. Every other half is then directed to a separate conveyor belt with the cookies on one belt having their "inner" surfaces facing up and the halves on the other belt having their "inner" surfaces facing down. After a filling is placed on the halves having "inner" surfaces facing upwardly, the other cookie halves are brought into juxtaposed position with the filled halves and assembled into a sandwich or filled cookie. Another variation of this type of apparatus involves feeding the top and bottom cookie halves onto two different belts with the "inner" surface disposed upwardly in each instance. A filling is deposited on the halves on one of the conveyors and the halves on the other conveyor are inverted and deposited on top of the filled half to form a sandwich or filled cookie.

SUMMARY OF THE INVENTION

The present invention provides a cookie capper apparatus and method wherein a filled cookie can be assembled from a plurality of cookie halves which are fed directly from the oven-cooler on a transfer conveyor belt with the flat or inner surface facing downwardly on the conveyor belt and the rounded or outer surface disposed upwardly. Every other row of cookie halves are inverted or flipped 180°, a filling is deposited onto the inverted cookie halves and the non-inverted cookie halves are raised by a vacuum transfer device and deposited onto the filled cookie halves as they are brought underneath the raised cookie halves by the conveyor belt. The direct feeding of the cookie halves from the transfer conveyor belt directly onto a second belt while automatically inverting every other row of cookie halves eliminates several handling steps required in the prior art systems described above.

The present invention provides a unique apparatus and method for automatically inverting every other row of cookie halves as they emerge from the oven-cooler comprising a first transfer conveyor belt and a second conveyor belt spaced below and aligned with the first transfer conveyor belt a sufficient distance to allow free-falling cookie halves to flip 180° and a slide means privoted beneath the end of the transfer conveyor belt which is adapted to be pivoted outwardly about a horizontal axis into the path of the falling cookie halves so as to deflect every other row of cookie halves onto the second conveyor belt without flipping.

The present invention provides a unique apparatus and method for depositing a filling on every other row of cookie halves wherein gate means are provided to temporarily stop the movement of a row of cookies on the conveyor while a filling is deposited thereby eliminating the necessity of moving the filling means in the direction of movement of the conveyor.

The present invention provides a unique method of placing the top cookie on the bottom cookie wherein gate means stop a row of top cookies, vacuum means raise the row of top cookies, a row of bottom cookies is stopped by the gate means, the vacuum means deposits the row of top cookies on the row of bottom cookies while sizing the cookies, and the gate means allows the passage of the completed cookie on the conveyor.

The foregoing and other objects, features and advantages of the invention will be apparent from the following more particular description of a preferred embodiment of the invention as illustrated in the accompanying drawings.

BRIEF DESCRIPTION OF THE DRAWINGS

FIG. 1 is a side elevation view of the apparatus according to the present invention.

FIG. 1a is a schematic view of the cookie half transfer arrangement according to the present invention with the slide means in a position to allow the cookie halves to flip 180°.

FIG. 1b is a schematic view of the cookie transfer apparatus according to the present invention with the slide means interposed to prevent the cookie halves from flipping 180°.

FIG. 1c is a schematic view of the cookie capping operation.

FIG. 2 is a sectional view taken along the line 2—2 of FIG. 1.

FIG. 3 is a sectional view taken along the line 3—3 of FIG. 1.

FIG. 4 is a sectional view taken along the line 4—4 of FIG. 1.

FIG. 7 is a partial top plan view of the first gate.

FIG. 8 is an end elevation view, partly in section, of the first gate.

FIG. 9 is a partial top plan view of the vacuum transfer apparatus and the third gate.

FIG. 10 is an end elevation view, partly in section, of the vacuum transfer apparatus and the third gate.

FIG. 11 is a timing chart showing the sequence of operation of the gates, slide means and vacuum transfer apparatus.

DETAILED DESCRIPTION OF THE INVENTION

Figure 5:
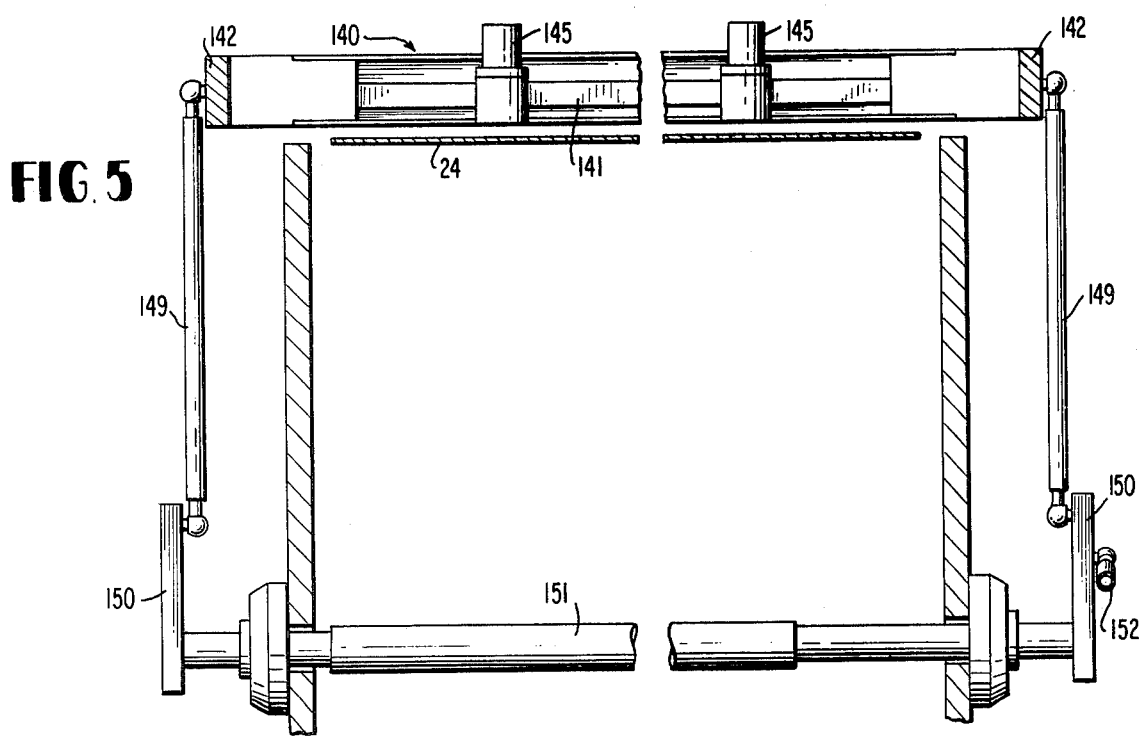
FIG. 5 is a sectional view taken along the line 5—5 of FIG. 1.
Figure 6:
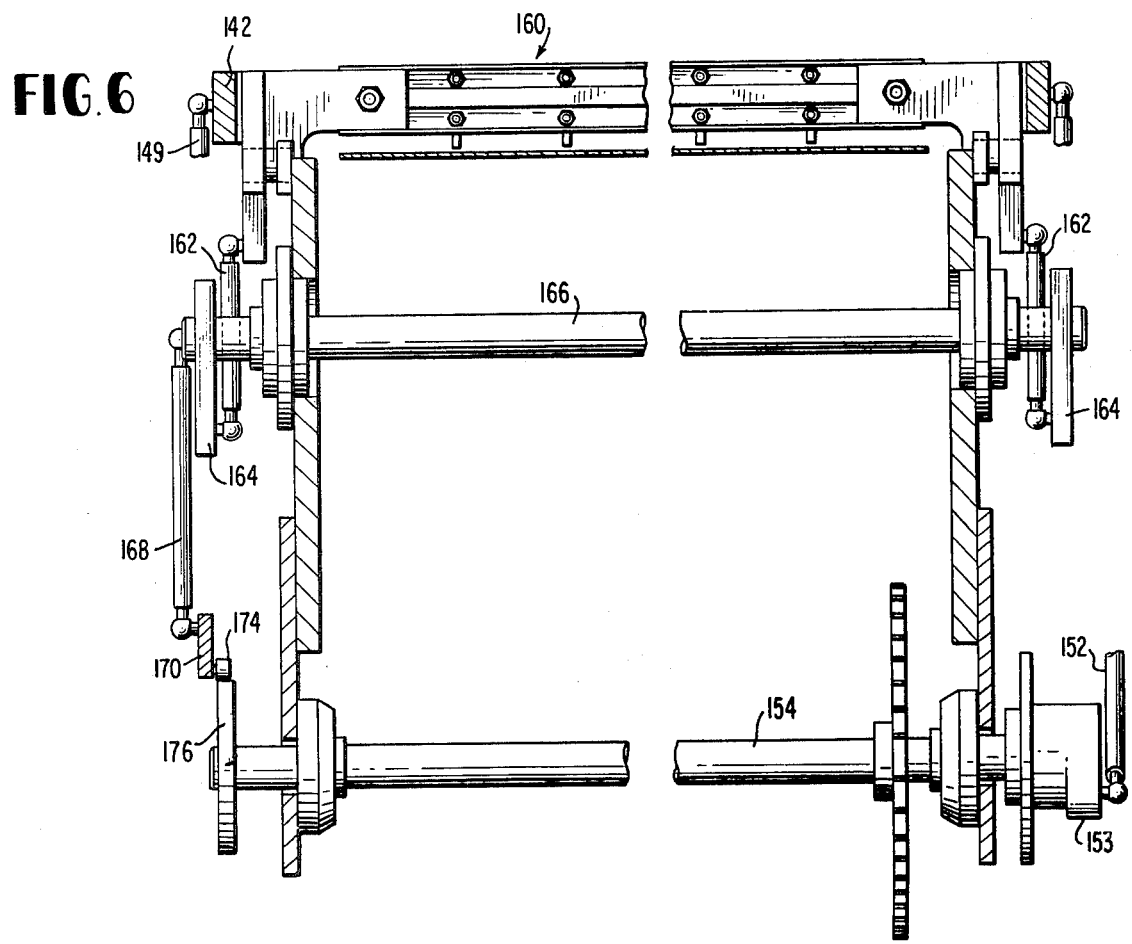
FIG. 6 is a sectional view taken along the line 6—6 of FIG. 1.

The cookie capper apparatus according to the present invention is comprised of a first transfer conveyor belt 20 which is of the endless type. The belt as shown in FIG. 1 is entrained about a small diameter pulley 22 having a small enough diameter relative to the size of the cookies which will cause the cookies to flip more quickly as they fall from the belt. A second conveyor belt 24 is entrained about a first pulley 26 and a second pulley (not shown) at the opposite end of the machine and extends substantially the entire length of the frame 28. The pulley 26 is disposed substantially beneath the pulley 22 so that the cookies halves falling from the end of the conveyor belt 20 will fall on the conveyor belt 24, the upper run of which travels from left to right as viewed in FIG. 1.

A first gate 30 extends across the entire width of the belt 20 and as best seen in FIGS. 2, 7 and 8, is comprised of a transversely disposed hollow rectangular bar 32 which is supported at each end beyond the sides of the conveyor by means of arms 34 which are pivotally mounted to the frame 28 by means of shafts 36. A "U" shaped channel member 38 is secured to the face of the bar 32 and a plurality of vertically disposed pins 40 are secured thereto by means of integral bolts 41 which extend through apertures in the channel member 38 and which are secured by nuts 44. The lower end of the pins 40 are closely spaced from the second conveyor belt 24 and adjacent pins 40 are spaced apart a distance sufficient to engage a cookie half 42 when the gate is disposed in the positions shown in FIGS. 1, 2, 7 and 8. When the gate 30 is pivoted in the clockwise direction about the shaft 36 as viewed in FIGS. 1 and 8, the pins will be raised a sufficient distance above the surface of the belt to allow a row of cookies extending transversely of the transfer conveyor belt 20 to pass beneath the gate and off the end of the belt 20. The channel member and pins can readily be replaced by a substitute channel having a different arrangement of pins to accommodate different types of cookies.

In order to raise and lower the gate 30, links 46 are connected at one end to opposite ends of the gate 30 at pivots 48 and at the other end to one arm of bell crank levers 50 at pivots 52. The bell crank levers 50 are pivotally mounted on the frame 28 by pivot shaft 54 and an operating link 56 is connected to the other arm of one of the bell crank levers 50 at pivot 58. The opposite end of the link 56 is connected to a cam follower lever 60 at pivot 62 and the cam follower lever is in turn pivoted to the frame 28 by pivot 64. A roller 66 is rotatably mounted at the free end of the cam follower lever 60 and is maintained in engagement with the surface of cam 68 which is mounted on and rotatably driven by shaft 70 which in turn is driven by suitable means not shown. The cam 68 is provided with two cam lobes so that for each complete revolution of the cam 68 the gate 30 will be raised and lowered twice to allow two rows of cookie halves to pass therebeneath.

Mounted directly beneath the end of the transfer conveyor belt 20 is an elongated rectangular slide plate 72 which extends across the entire width of both belts 20 and 24. The slide plate 72 is mounted on a pivot shaft 74 which is rotatably mounted at opposite ends in the frame 28. An actuator arm 76 is connected to one end of the shaft 74 and a link 78 is pivotally connected to the arm 76 at 80. The opposite end of the link 78 is pivotedly connected to a cam follower lever 82 at 84 and the cam follower lever 82 is pivoted about the same pivot pin 64 as the cam follower lever 60. A suitable roller 85 similar to the roller 66 is mounted on the cam follower lever 82 and maintained in engagement with the periphery of cam 86 which is provided with a raised elongated lobe which will provide for a single cycle of operation for the slide member 72 during the period of time the gate 30 is raised and lowered twice. A spring means (not shown) are provided for biasing the cam follower levers 82 and 60 against the cams 86 and 68, respectively.

In the operation of the foregoing apparatus, a plurality of rows of cookie halves will emerge on the belt 20. The rows extend transversely across the width of the conveyor and the number of cookie halves in each row will be dependent upon the width of the conveyor belt 20. The rows of cookie halves will proceed until they abut against the fingers 40 of the first gate 30 which will align the cookies in a straight row as well as equally space the cookies from each other. Succeeding rows of cookies may also be abutted against each preceding row and the spacing of the fingers 40 (FIG. 7) to engage each cookie half at a point past the leading edge of the cookie half enables the gate to be raised and lowered to release a row of cookies without fear of damaging the succeeding row of cookies upon descent of the gate.

When the gate 30 is momentarily raised, a row of cookies is allowed to pass beneath the gate and fall off the end of the transfer conveyor. If the slide member 72 is in the position shown in FIG. 1a, the cookie halves will not engage the slide member and therefore be allowed to flip 180°. In order for the cookie halves to flip 180°, the two conveyor belts 20 and 24 should be spaced apart a distance proportional to the size of the cookie halves. When the slide member 72 is disposed in the position shown in FIG. 1b when a row of cookies fall off the end of conveyor 20, the cookie halves will engage the slide member 72 before they can flip 180° and merely slide down the surface of the slide member 72 onto the conveyor belt 24 in the same orientation as on belt 20. As the cookies emerge from the oven-cooler they will be provided with a flat surface engaging the conveyor and a rounded upper surface. The flat surface of the cookie halves will be disposed inwardly in engagement with the filling in the finished cookie sandwich and will therefore be referred to as the inner surface while the rounded surface will be referred to as the outer surface. During a complete revolution of the cam shaft 70, the first gate 30 will be raised and lowered twice as evidenced by the timing chart in FIG. 13. While the gate is raised the first time to release a row of cookies, the slide member 72 will be disposed in its full out position as shown in FIG. 1b due to the engagement of the cam follower lever 82 with the lowermost surface of the cam 86. However, by the time the gate 30 is raised the second time during a cycle of operation to release a second row of cookie halves, the slide 72 will be disposed in its full back position as shown in FIG. 1a since the cam follower lever 82 will be in engagement with the raised portion of the cam surface 86. Thus, alternate rows of cookie halves will be disposed with their inner surface up and their inner surface down, respectively, on the conveyor belt 24.

As the result of falling from one conveyor belt to another, the rows of cookie halves might be slightly out of alignment. Therefore, in order to realign and properly space the cookie halves in each row in a perfectly straight line as they arrive at the filling station 110, a second gate 90 is provided. The detailed construction of the gate 90 (FIG. 3) is identical to the gate 30 with the exception of the end portions 92 which extend beyond the frame a greater distance than the end portions of the gate 30 so that the operating links 94 will not interfere with the operating link 56 of the gate 30 and the operating link 78 for the slide member 72. The links 94 are connected at one end to the ends 92 of gate 90 by the pivots 96 and at the other end to one arm of bell crank levers 98 by pivots 100. A second operating link 102 for the second gate 90 is connected at one end to the other end of one of bell crank levers 98 at pivot 104 and is connected at the other end to a cam follower lever 103 which is identical to cam follower lever 60 and mounted on the same shaft 64 but outwardly of the lever 60 from the frame 28. This cam follower lever would cooperate with the cam 106 shown in FIGS. 1 and 4 which is also disposed outwardly of the cam 68 on the shaft 70. The cam 106 is identical to the cam 68 so that the same timing sequence is imparted to the gate 90 that is imparted to the gate 30 as evidenced by the timing chart in FIG. 11.

As every other row of cookies engages the second gate 90 at the filling station generally indicated at 110, a predetermined amount of filling is deposited on each cookie in the row. Such filling stations are conventional in the art and generally consist of a filling chamber 113 having a plurality of nozzles 111, one for each cookie in a row. The chamber 113 and nozzles 111 may reciprocate in a vertical direction as the rows of cookies arrive in timed relation therewith and are so coordinated as to deposit a predetermined amount of filling on the cookies in every other row, namely the rows of cookies having the flat side or inner surface facing upwardly. The chamber and nozzles could also remain stationary at a predetermined distance above the conveyor. The control means for the nozzle to meter the proper amount of filling in timed relation to the arrival of every other row of cookies is conventional. The means for reciprocating the filling station 110 up and down could utilize a power cylinder arrangement or could be similar to the means for raising and lowering the gates.

As each row of unfilled cookie halves approaches the capping station indicated at 120 in FIG. 1, the vacuum transfer head 140 will be raised thereby allowing the row of unfilled cookie halves to engage the third gate indicated at 160. As shown by the timing chart in FIG. 11, the vacuum transfer head 140 will then descend into engagement with the unfilled cookie halves and a vacuum will be applied to raise the cookie halves as the head 140 rises again. The succeeding row of filled cookie halves will then move beneath the raised cookie halves into abutment with the third gate 160 as best seen in FIG. 1c and the vacuum transfer head will be lowered and the vacuum shut off to deposit the unfilled cookie halves on the filled cookie halves. The vacuum transfer head presses the top cookie half downward to spread out the filling and provide a filled cookie or sandwich having a predetermined thickness. The vacuum transfer head 140 and third gate 160 will then be raised simultaneously allowing the filled and capped cookies or sandwiches to pass therebeneath. This operation is automatic without impeding the movement of the filled cookies or sandwiches and the same then passes to conventional packaging means (not shown) which do not form a part of the present invention.

The vacuum head 140 is constructed similar to the gates 30, 90 nad 160 inasmuch as a hollow rectilinear bar 141 extends transversely of the conveyor and is pivoted for up and down movement by means of side arms 142 which are pivoted to the frame by pivot shafts 143. The hollow bar 141 acts as a plenum chamber for the air supply and is provided with a plurality of spaced apart apertures 144 which allow the air to pass into a plurality of vacuum jets 145 which are mounted on the bar 141 adjacent each aperture 144. The air which is supplied under pressure in the range of 40–80 psi enters an annular chamber 146 about a central passage 147. The air is directed from the annular chamber 146 into the central passage through a plurality of jets 148 to create a vacuum or low pressure area at the lower end of the central passage 147. The differential in air pressure between the upper and lower surfaces of the cookie half will allow the cookie half to be picked up as the vacuum head is moved upwardly. The vacuum transfer head is pivoted up and down about the pivot shafts 143 by means of links 149 which are pivotally connected to the side arms 142 and lever arms 150 connected to a pivot shaft 151 extending transversely of the machine. One of the lever arms 150 is pivotally connected to a link 152 which is pivotally connected at the opposite end to a crank 153 secured for rotation to a drive shaft 154. Thus, for each rotation of the shaft 154, the vacuum head 140 will be raised and lowered through a single cycle. The angle through which the levers 150 oscillate is adjustable to vary the spacing between the head 140 and the conveyor at the lowest points in the cycle as seen in FIG. 11.

The third gate 160 is substantially identical in construction to the first and second gates 30 and 90, respectively, and is operated by links 162 which is pivotally connected at one end to the gate 160 and at the opposite end to intermediate lever arms 164 mounted on a pivot shaft 166 which extends transversely of the conveyor belt. A second link 168 is pivotally connected at one end to one of the lever arms 164 and at the opposite end to a cam follower lever 170 pivoted to the frame 28 at 172 and carrying a roller 174 which is disposed in engagement with the surface of cam 176 which is mounted on the opposite end of the shaft 154. Suitable spring means 173 are provided for maintaining the roller 174 in engagement with the peripheral surface of the cam 176.

The timing arrangement of the third gate 160 and the vacuum transfer head 140 is best seen in FIG. 11. The beginning of the cycle shown in FIG. 11 starts immediately after a plain cookie half has been placed on a filled cookie half. The vacuum transfer head 140 begins to rise and shortly thereafter the gate 160 also rises to allow the complete cookie sandwich to pass on the conveyor to the next station. As the gate and vacuum transfer head descend, the gate will reach its lowest point first to half the movement of a row of unfilled cookie halves. The vacuum head will continue its descent until it engages a row of cookie halves and as it does, the air will be turned on to create a vacuum so that upon the subsequent raising of the vacuum transfer head the cookie halves in that particular row will be raised. During this second raising of the vacuum transfer head the gate 160 will not be operated so that it will intercept and stop the subsequent row of filled cookie halves. The final descent of the vacuum transfer head as shown in FIG. 11 will place the plain cookie halves on the filled cookie halves and the air will be cut off to release the cookie halves from the vacuum transfer head. The vacuum transfer head and the mechanism for actuating the same are so designed as to approach closer to the conveyor belt when picking up an unfillied cookie half than when depositing a plain cookie half on a filled cookie half and pressing the plain cookie half downwardly.

The various cam shafts and conveyor shafts are all driven in timed relation in a conventional manner and the orientation of the cams and cranks on the shafts are such as to provide the timing sequence shown in FIG. 11. although the present invention has been described with respect to filled cookies, it is obvious that the method and apparatus could readily be utilized for analogous operations not only in the food processing industry but in manufacturing operations and the like.

While the invention has been particularly shown and described with reference to a preferred embodiment thereof, it will be understood by those in the art that various changes in form and details may be made therein without departing from the spirit and scope of the invention.

What is claimed is:

1. A method for producing filled cookies comprising feeding a supply of baked cookie halves the opposite sides of which are not identical sequentially on a first conveyor means, allowing alternate baked cookie halves to fall freely off the end of said first conveyor means onto a second conveyor means said alternate baked cookie halves landing upon the second conveyor means in inverted position, engaging the other cookie halves with movable slide means to prevent said other cookie halves from being inverted during the free fall from the first conveyor means to a second conveyor means, placing a filling on the inverted cookie halves and transferring the non-inverted cookie halves onto the filled cookie halves to provide filled cookies.

2. A method as set forth in claim 1 wherein the transferring of the non-inverted cookie halves onto the filled cookie halves is accomplished by stopping the movement of each non-inverted cookie half on said second conveyor means, vertically raising said stopped cookie half to allow an inverted cookie half having a filling thereon to move under the raised cookie half, stopping the inverted cookie half having a filling thereon directly under the raised cookie half, lowering the raised cookie half onto the inverted cookie half having the filling thereon and allowing the filled cookie to continue movement on said second conveyor means.

* * * * *